United States Patent
Ohara

(10) Patent No.: US 7,372,589 B2
(45) Date of Patent: May 13, 2008

(54) PRINTING SYSTEM AND PRINT CONTROL METHOD

(75) Inventor: Hiromi Ohara, Kokubunji (JP)

(73) Assignee: Fuji Xerox Co., Ltd., Tokyo (JP)

( * ) Notice: Subject to any disclaimer, the term of this patent is extended or adjusted under 35 U.S.C. 154(b) by 731 days.

(21) Appl. No.: 10/303,814

(22) Filed: Nov. 26, 2002

(65) Prior Publication Data

US 2003/0098993 A1    May 29, 2003

(30) Foreign Application Priority Data

Nov. 28, 2001  (JP)  ............................. 2001-363473

(51) Int. Cl.
*B41J 1/00*  (2006.01)

(52) U.S. Cl. ..................... 358/1.15; 709/203

(58) Field of Classification Search ............... 358/1.15, 358/1.14, 1.16, 1.13, 1.9; 709/201, 203
See application file for complete search history.

(56) References Cited

U.S. PATENT DOCUMENTS

| | | | | |
|---|---|---|---|---|
| 6,348,971 | B2* | 2/2002 | Owa et al. ................. | 358/1.15 |
| 6,707,566 | B1* | 3/2004 | Endoh ....................... | 358/1.15 |
| 6,970,261 | B1* | 11/2005 | Robles ...................... | 358/1.15 |
| 7,161,707 | B1* | 1/2007 | Fukushima et al. .......... | 358/1.6 |
| 7,173,718 | B2* | 2/2007 | Iwata et al. ............... | 358/1.13 |
| 2002/0051204 | A1* | 5/2002 | Ohara ....................... | 358/1.16 |
| 2002/0163665 | A1* | 11/2002 | Iwata et al. ............... | 358/1.15 |
| 2002/0171868 | A1* | 11/2002 | Yoshimura et al. ......... | 358/1.15 |
| 2004/0109191 | A1* | 6/2004 | Ohshima ................... | 358/1.13 |
| 2004/0190042 | A1* | 9/2004 | Ferlitsch et al. ........... | 358/1.15 |
| 2007/0103726 | A1* | 5/2007 | Iwata et al. ................ | 358/1.15 |

FOREIGN PATENT DOCUMENTS

JP          08292844 A   * 11/1996
JP        A-08-282844     11/1996

(Continued)

*Primary Examiner*—Kimberly A. Williams
(74) *Attorney, Agent, or Firm*—Oliff & Berridge, PLC

(57) ABSTRACT

A printing system configured by connecting, over a network, a client terminal for making a printing request using a printer driver, a terminal for making a server-dedicated print request, a server which receives the printing requests from the client terminal and the terminal and instructs printers that corresponds to the printing requests to perform printing, and multiple printers which perform printing in accordance with the printing instruction from the server, the server having a logical printer in which physical printers of output destinations are previously registered and various printing instruction information are set, and supports printing functions for performing printing in accordance with a print instruction set in a logical printer specified by a user, in which the server comprises: an examination unit which, when the server receives the printing request, checks whether or not the received printing request is specified by the printer driver of the client terminal; a recognition unit which, if the examination unit determines that the received printing request is specified by the printer driver of the client terminal, analyzes the received print data and recognizes contents of user's print instruction; and a print control unit which performs a print control by reflecting the contents of the user's print instruction recognized by the recognition unit on print job attributes of the specified logical printer so to make the printing instruction to a printer that satisfies conditions of the use print instruction.

15 Claims, 8 Drawing Sheets

FOREIGN PATENT DOCUMENTS

| | | |
|---|---|---|
| JP | A-10-063445 | 3/1998 |
| JP | A-11-105382 | 4/1999 |
| JP | A-2000-284936 | 10/2000 |
| JP | A-2001-290626 | 10/2001 |
| WO | WO0177808 A1 * | 10/2001 |

* cited by examiner

AN EXAMPLE OF JOB OBJECT

| | |
|---|---|
| JOB NAME | MEETING DATA 1 |
| JOB SENDER NAME | TANAKA |
| SPECIFIED PAPER SIZE | A4 |
| SPECIFIED FINISHING | STAPLING AT UPPER LEFT |
| SPECIFIED NUMBER OF COPIES | 50 |
| SPECIFIED JOB COMMENT | KEEP ONE COPY AND DISTRIBUTE THE REST FOR MEETING DATA |

PRINTING SYSTEM AND PRINT CONTROL METHOD

BACKGROUND OF THE INVENTION

1. Field of the Invention

The present invention relates to a printing system including a server which supports printing functions using a logical printer, which pre-registers physical, printers to which outputs are delivered and sets various print instruction information. In particular, the present invention relates to a printing system and a print control method which allow the print instructions specified by a printer driver to be reflected on print job attributes of the logical printer.

2. Description of the Related Art

Recently, a concept called a logical printer is suggested in printing systems.

This logical printer is utilized such that, information a user wishes to make a print instruction is previously described in the logical printer, and when the user instructs printing, the information previously instructed to the logical printer is applied.

For example, when a Letter Logical Printer is created, data is outputted on letter-size paper even if the user specifies other sizes of paper.

This is caused because of the following. Different from default values for a document set to a printer driver, plural logical printers (plural kinds of settings) can be created for one physical printer and, while setting information of the printer driver depend on a user environment, in the case of the logical printer, since the setting is made onto the printer side, it is possible to set it from anywhere without depending on the user environment. In the case of specifying by the printer driver, when a different setting is needed, it is required to select a detailed setting for printing, or for some of the applications, a special setting cannot be set if a detailed print setting screen of the printing cannot be displayed. However, in the case of the logical printer, it is possible to apply a detailed setting to an output destination printer by changing the logical printer set as the output destination.

When the above-described logical printer is used for printing, information specifying the number of prints can be set previously in the logical printer or values specified by the print driver can be used as they are.

Specifically, when the number sets of prints is set as eight in the logical printer, it is possible to print eight sets of prints even when the number of sets of prints is set as three in the printer driver. Alternatively, when the number of sets of prints is not set in the logical printer, the number of sets of prints set in the printer driver, that is, in this example, three sets of prints are printed out.

Meantime, in a printing system using a server that supports a distributed output function, which has been provided recently, the following inconveniences occur.

Specifically, when an automatic print number division is set by a distribution output method and information specifying the number of prints is previously set in the logical printer, it is possible to appropriately divide the number of prints and to distribute a job to multiple printers. However, once such information is specified by the print driver, it is impossible to perform the divided output appropriately.

The reason for this is that the information specified by the printer driver depends on the PDL (Printer Description Language), and thus the contents of a print instruction specified by a user are unknown until a printer decomposes the PDL.

Further, in the conventional technique, it is also impossible to cope with a proof printing function, which is a function to output one set of prints before printing plural numbers of sets of prints to check whether or not the output condition and the setting of printing instruction are appropriate.

Specifically, when a user instructs a proof printing, that is, the user makes a print instruction to perform the proof printing with one set of prints for several times and thereafter perform printing of the rest of the number of sets of prints, it is impossible to perform the printing of "the number of sets of prints that the user first specified–(minus) one set of prints", that is, the rest of the number of sets of prints to be printed.

As describe above, the conventional printing system did not have a means by which a print instruction specified by a printer driver of a client terminal can be reflected on print job attributes of a logical printer.

SUMMARY OF THE INVENTION

The present invention is made in view of the above circumstances and provides a printing system and a print control method by which print instructions specified by a printer driver can be reflected on print job attributes of a logical printer.

According to an aspect of the present invention, there is provided a printing system configured by connecting, over a network, a client terminal for making a print request using a printer driver, a terminal for making a server-dedicated print request, a server which receives the print requests from the client terminal and the terminal and instructs printers that corresponds to the print requests to perform printing, and multiple printers which perform printing in accordance with the print instruction from the server, the server having a logical printer in which physical printers of output destinations are previously registered and various print instruction information are set, and supports printing functions for performing printing in accordance with a print instruction set in a logical printer specified by a user, wherein the server comprises:

an examination unit which, when receiving the print request, checks whether or not the received print request is specified by the printer driver of the client terminal;

a recognition unit which, if the examination unit determines that the received print request is specified by the printer driver of the client terminal, analyzes the received print data and recognizes contents of the print instruction specified by the user; and a print control unit which performs a print control by reflecting the contents of the user's print instruction recognized by the recognition unit on print job attributes of the specified logical printer so to make the print instruction to a printer that satisfies conditions of the user's print instruction.

According to the present invention, since it is so arranged that when a server receives a print request and finds that the print request is specified by the printer driver of a client terminal, the server analyzes the received print data, recognizes the contents of the user's print instruction, reflects the recognized contents of the user's print instruction on print job attributes of a specified logical printer and makes a print instruction to a printer that satisfies the user's print instruction, it is possible to perform printing in which the print instruction specified in the print driver is reflected in the print job attributes of a logical printer.

BRIEF DESCRIPTION OF THE DRAWINGS

Preferred embodiments of the present invention will be described in detail based on the following figures, wherein:

FIG. 3 is a diagram illustrating an exemplary job object;

DETAILED DESCRIPTION OF THE PREFERRED EMBODIMENTS

Hereinafter, embodiments of a printing system and a print control method according to the present invention will be described in detail with reference to the attached figures.

Figure 1:
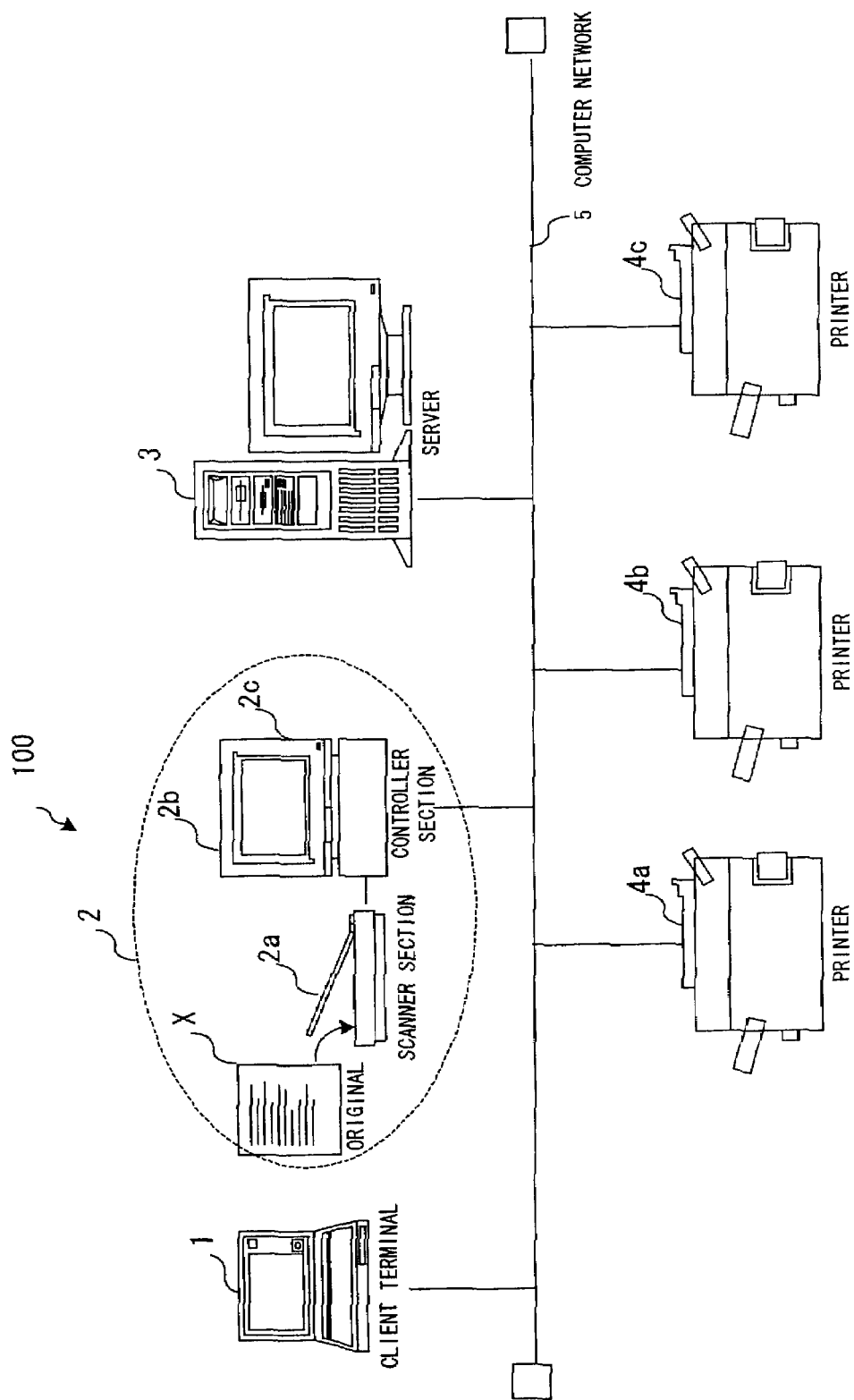
FIG. 1 is a diagram illustrating an exemplary configuration of a printing system to which the present invention is applied.

FIG. 1 is a diagram illustrating an exemplary configuration of a printing system 100 to which the present invention is applied.

As shown in FIG. 1, the printing system 100 is configured by connecting a client terminal 1, a scanner system 2, a server 3, and printers 4a to 4c to a computer network 5.

Here, the client terminal 1 is a user terminal which instructs a print request for the printers 4a to 4c by user's request. Specifically, the client terminal 1 is configured by a personal computer (P/C) or the like. This client terminal 1 has a print driver and, when the user instructs printing from the print driver, describes print instruction information of the user into the inside of print data as PDL.

The scanner system 2 scans a paper original X and sends the scanned paper original data together with the print instruction information inputted by the user to the server 3 which was set beforehand to make the print request.

This scanner system 2 is configured with a scanner section 2a, a display section 2b, and a controller section 2c. The scanner section 2a serves to scan the paper original X, the display section 2b serves to display a series of setting operations which are used by the user when the user makes a print request using this scan system, and the controller section 2c serves to control the transmission of the paper original data scanned by the scanner section 2 and the print instruction. When the user makes a print request, this scanner system 2 transmits to the server 3 information of the print instruction definition and print data that are the data scanned by the scanner system 2.

The server 3 serves to control and manage the printing in this system, for example, the server 3 receives print requests from the client terminal 1 and the scanner 2 and performs print processing by using one or multiple printers among the multiple printers 4a to 4c depending on the print instruction. Specifically, this server 3 configured by a work station (W/S) or a personal computer (P/C) or the like. This server 3 has a logical printer in which physical printers for output destinations are previously registered and various print instruction information are set, and executes printing functions for performing printing in accordance with a print instruction set in a logical printer specified by a user, The printers 4a to 4c perform printing in accordance with the print instructions sent from the server 3.

The computer network 5 is a communication network for providing an intercommunication among various components of this system and is configured by a Local Area Network (LAN), for example.

Figure 2:
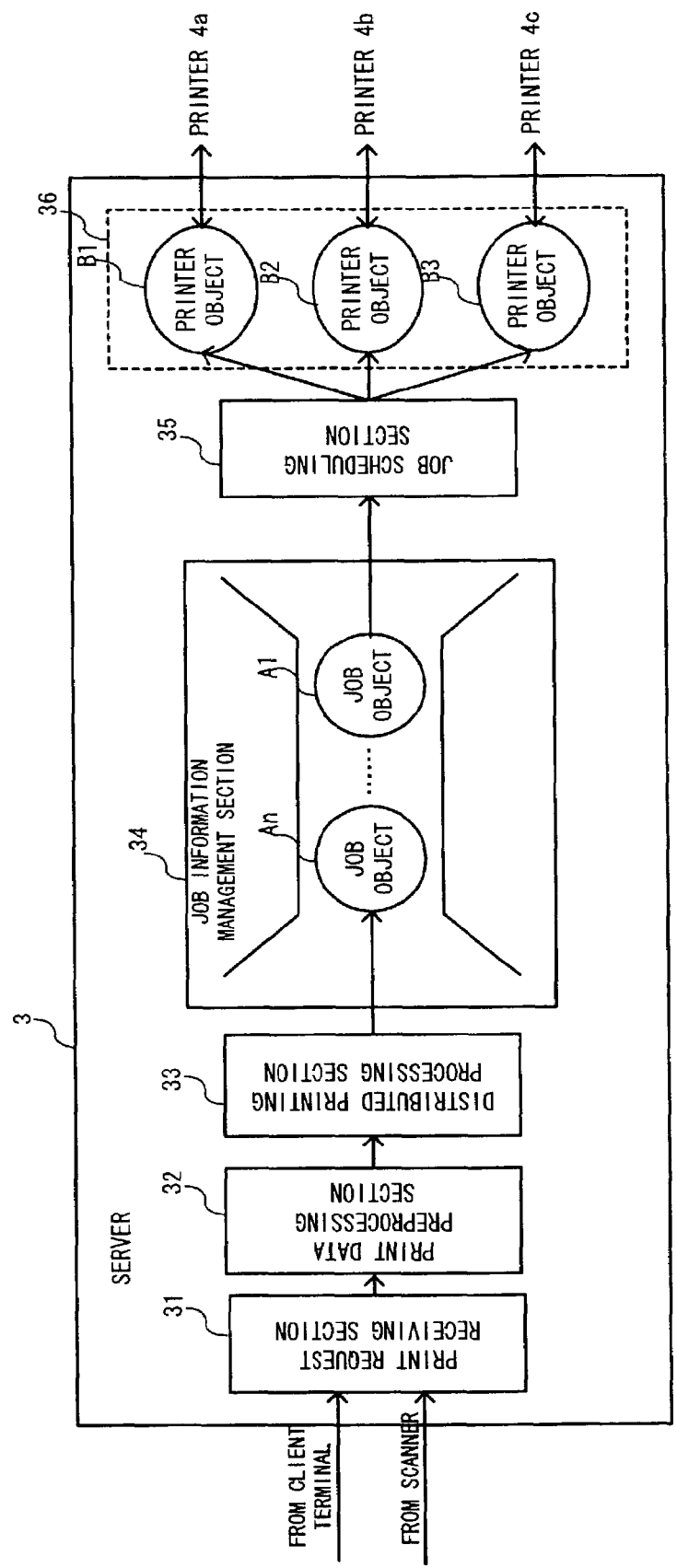
FIG. 2 is a block diagram illustrating main components of a server shown in FIG. 1.

FIG. 2 is a block diagram illustrating main components of the server 3 shown in FIG. 1.

As shown in FIG. 2, this server 3 is configured with a print request receiving section 31, a print data preprocessing section 32, a distributed printing processing section 33, a job information management section 34, a job scheduling section 35, and a printer information management section 36.

Here, the print request receiving section 31 accesses the job information management section 34 to generate job objects (A1, . . . , An) in accordance with the print instruction from the client terminal 1, and stores the contents of the print instruction from the user as job attributes. An example of a job object is shown in FIG. 3. As shown in FIG. 3, the job object manages information of a job specified by a user as attributes and attribute values.

The print data preprocessing section 32 parses print data passed from the client terminal 1. When the result of parsing shows that the print data is the PDL language, the print data preprocessing section 32 parses the print data in accordance with the PDL language specification, determines the contents of print instruction specified by a printer driver, accesses to the job information management section 34 and stores the contents of the print instruction as job attributes.

The distributed printing processing section 33 accesses to the job information management section 34 to perform a divided printing processing or a simultaneous-multi printing processing (a processing for printing the number of prints same with the specified number of prints from multiple printers at the same time) based on the job attribute values.

Figure 4:
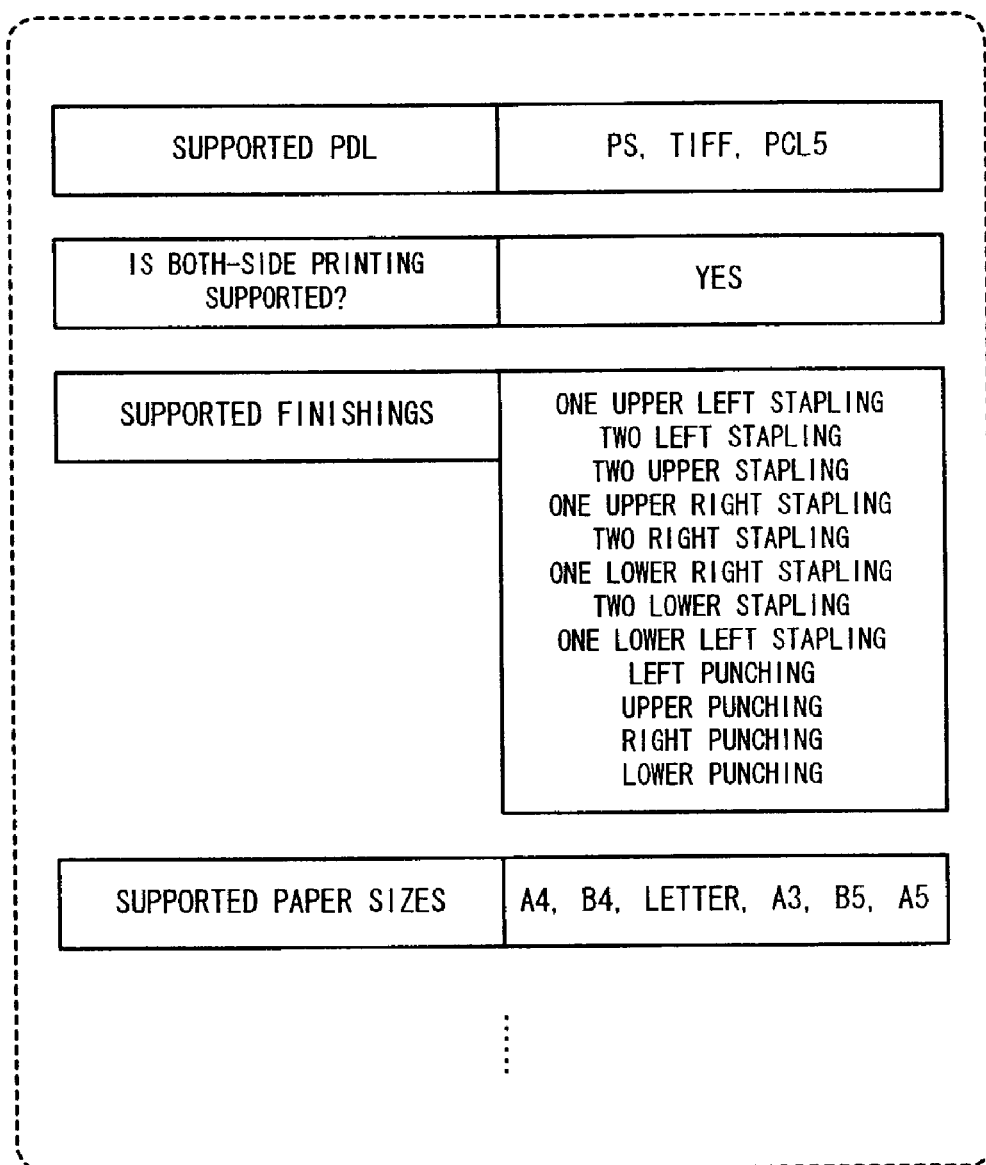
FIG. 4 shows a diagram illustrating an exemplary printer object.

The printer information management section 36 manages printer objects (B1, B2, and B3) that correspond to printers existing on the network. FIG. 4 shows an example of a printer object. As shown in FIG. 4, a printer object manages function information supported by a printer as attributes and attribute values. These attributes and attribute values of the printer object are updated by regularly exchanging information between the print server and the printers, and the updated information is managed at the print server side.

The job scheduling section 35 compares job attributes of a job object stored in the job information management section 34 with attribute values of each printer object managed by the printer information management section 36 and assigns a job to a printable printer.

Specifically, this job scheduling section 35 set a job schedule for a printer having necessary functions by comparing job attributes and attribute values and printer attributes and attribute values. For example, when "stapling at an upper left position" is specified in the job attribute as a part of the finishing setting, then the job scheduling section 35 sets the schedule for a printer which has the setting information of "stapling at an upper left position" in the finishing attribute values supported by the printer attribute thereof.

Although not illustrated, this server 3 has a mechanism by which print instruction information specified by a user such as information for the number of prints set by the printer driver is obtained from PDL data generated by the printer driver to separately store this print instruction data specified by the user and actual image data to be printed on paper. This mechanism eliminates the need for recreating PDL data each time the instruction is changed.

Next, a user interface (UI) for communicating a print instruction to the client terminal 1 shown in FIG. 1 will be described.

Figure 5:
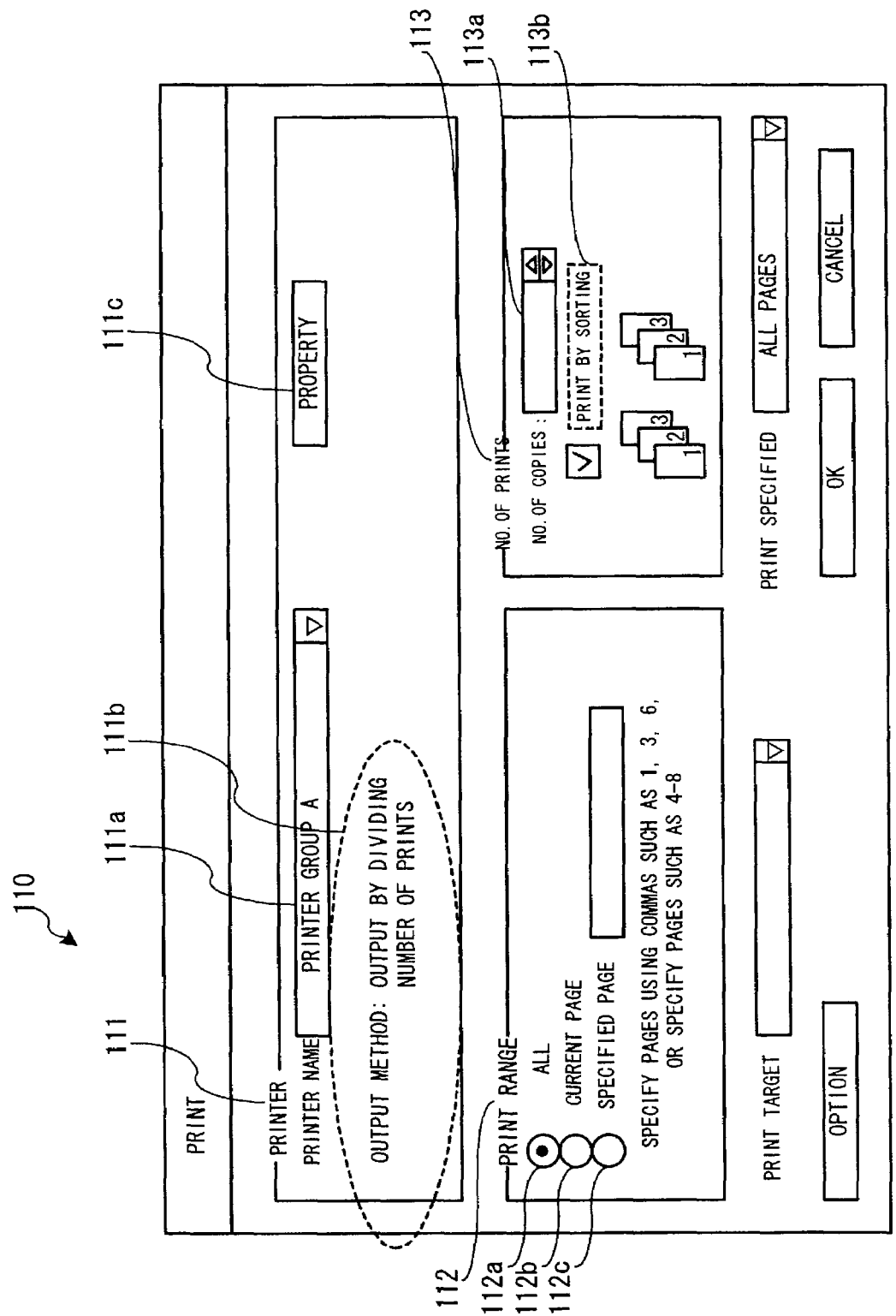
FIG. 5 shows an exemplary screen of a printer driver of a client terminal.

FIG. 5 is a diagram illustrating a printer driver screen, i.e., print instruction setting screen 110 of the client terminal 1.

As shown in FIG. 5, this print instruction setting screen 110 includes a printer setting zone 111, a print range setting zone 112, and a print number setting zone 113.

The printer setting zone 111 includes a printer name list indicator 111a, an indication zone 111b, and a property button 111c. The printer name list indicator 111a indicates a list of printers which are set in a computer. The indication zone 111b indicates an output method, e.g., "output by dividing the number of prints", etc. The property button 111c is pushed (or clicked) when a printer setting is changed. It should be noted that options that can be set by pushing the property button 111c are different depending on the function of a printer.

Here, the printer name list indicator 111a indicates the name of a physical printer that actually performs printing and the name of a logical printer set in the print server.

The print range setting zone 112 is used for specifying the range of printing and which includes a "print all" section 112a for specifying to print the entire document, a "print current page" section 112b for specifying to print a current page only, and a "print specified page" section 112c for specifying to print a specified page.

The print number setting zone 13 includes a print number setting section 113a for setting the number of prints and a sorting setting section 113b for setting sort printing to print by a unit of the number of prints, i.e., one set by one set, when plural numbers of prints are to be printed.

The name of a logical printer of a print server is specified in the printer name list indicator 111a of the printer setting zone 111. In this example, "printer group A", which is a logical printer registered in the print server by grouping multiple physical printers, is selected.

In other words, a user uses this screen to set various print instructions such as the number of prints or the stapler setting.

Figure 6:
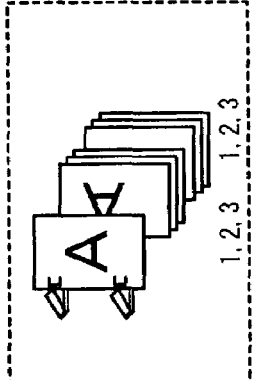
FIG. 6 is a diagram illustrating a stapler-setting screen.

FIG. 6 shows a stapler setting screen. In FIG. 6, a property setting screen 120 is shown which is displayed on a display screen when the property button 111c in the screen shown in FIG. 5 is pressed. In this example, the property setting screen 120 indicates a property screen of the printer group A. A user uses this screen to set whether or not stapling is needed or a location of stapling, for example.

Next, the processing steps by the server 3 having the above-described configuration will be described.

Figure 7:
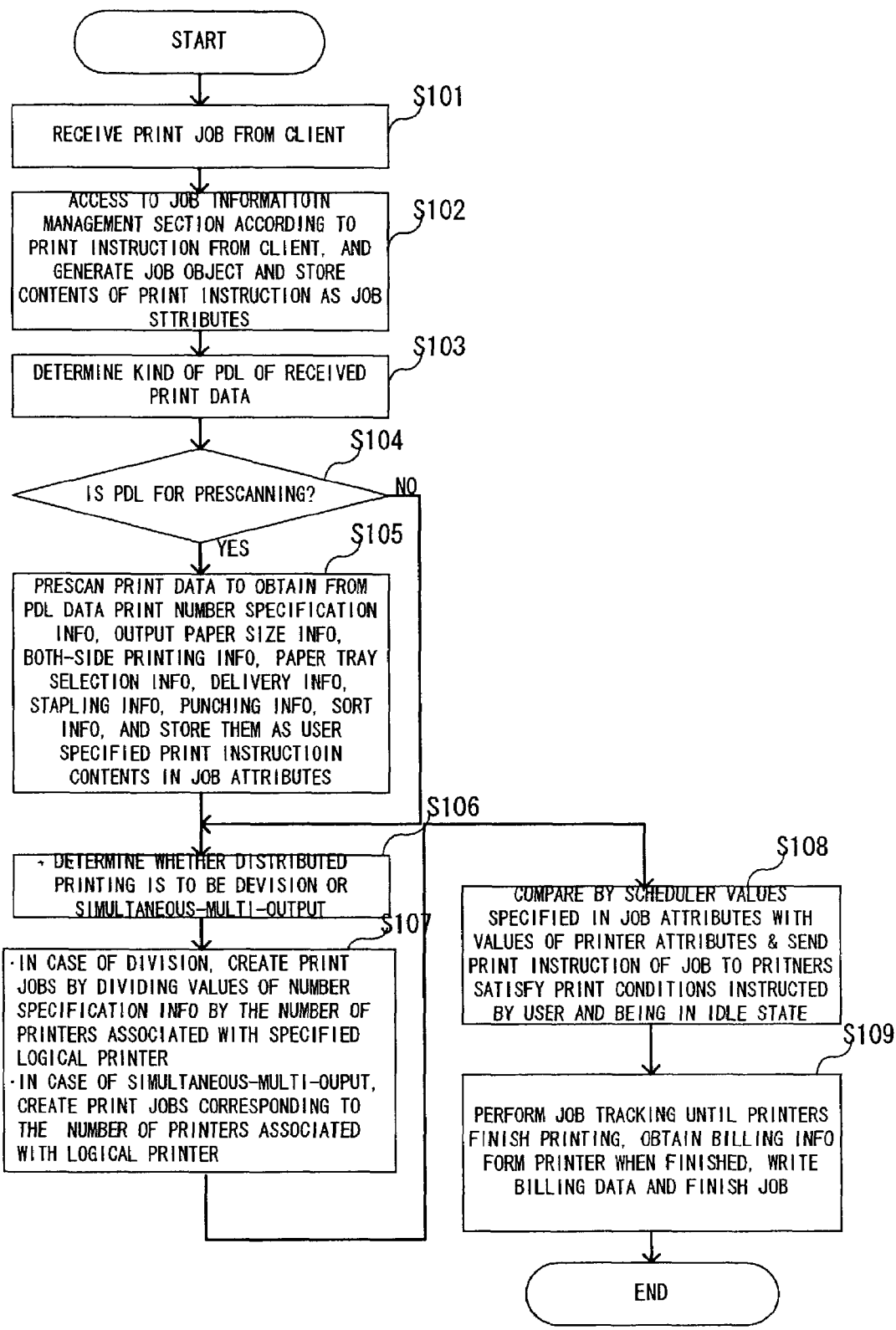
FIG. 7 is a flowchart illustrating a printing procedure in the server.

FIG. 7 is a flowchart illustrating the distributed printing control process performed by the server 3.

As shown in FIG. 7, the server 3 firstly receives a print job from the client terminal 1 (Step S101).

Thereafter, the server 3 accesses to the job information management section 34 (see FIG. 2) in accordance with the print instruction from the client terminal 1 to generate a job object. Then, the contents of the print instruction by the user are stored as job attributes (Step S102).

Next, when receiving a print request, the server 3 determines a type of PDL of the received print data (Step S103).

If the determination results in that the PDL of the print data is for prescanning, i.e., if it is needed to obtain print instruction information specified by the user from the PDL data (Step S104: YES), then prescanning of the print data is performed to obtain, from the PDL data, print number specification information; output paper size information; both-side printing information; paper tray selection infor-mation; delivery destination information; stapling information; punching information; and sorting information, and the above obtained information are stored in job attributes as the contents of the user's print instructions (Step S105).

Next, the server 3 determines whether a distributed printing of the print job should be performed with a divided manner or a simultaneous-multi printing manner (Step S106).

If the above determination results in that the distributed printing of the print job should be performed with the divided manner (Step S106), then create print jobs are created by dividing the value of the print number setting information of the job attributes by the number of printers associated with the specified logical printer. On the other hand, if the above determination results in that the distributed printing of the print job should be performed with the simultaneous-multi printing manner, print jobs that correspond to the number of printers associated with the specified logical printer are created (Step S107).

Thereafter, the job scheduling section 35 compares the values specified in the job attributes with the values of printer attributes and send print instructions of the job to such printers that satisfy printing conditions specified by the user and that are in idle conditions (Step S108).

Finally, because paper jam may occur, the server 3 tracks the jobs until the printers finish their printing operations. After the completion of the printing operations, billing information is obtained from the printers and when the billing data is written, the print job is completed (Step S109). At this point, the processing is finished. Note that the "billing information" used in this context is for calculating a cost as a budget is fixed in each department in a company or other organizations.

If the result of the determination in results in that the PDL of the print data is not for prescanning, i.e., if it is not need to obtain the print instruction information of the user from the PDL (Steps S103 and S104 NO), then processing proceeds to the above-described Step S106, thereby performing similar subsequent steps.

According to the above-described configuration, since it is so configured that the server 3 obtains print instruction information specified by a printer driver of a client terminal, reflects the obtained print instruction information on print job attributes, and makes a print instruction to those printers that satisfy the user-specified printing conditions, distributed output functions (e.g., automatic division processing or proof printing) supported by the server can be used even when print instruction is specified in PDL data such as output instructions from the printer.

Specifically, as the divided output operation, it is possible to output by dividing the specified number of prints into the number of the printers registered in the logical printer. For example, when a printer A and a printer B are registered in a logical printer and a user requests printing of ten sets of prints, it is possible to output five sets of prints from the printer A and output the rest of five sets of prints from the printer B.

Further, as the simultaneous-multioutput operation, it is possible to output the number of prints identical with the specified number of prints from multiple printers (at the same time). For example, when a printer A and a printer B are registered in a logical printer and a user requests printing of two sets of prints, it is possible to output two sets of prints from the printer A and also output two sets of prints from printer B.

Furthermore, as the output destination automatic selection operation, it is possible to output to a printer that satisfies the user's request and becomes available first from among the multiple printers registered in the logical printer.

Figure 8:
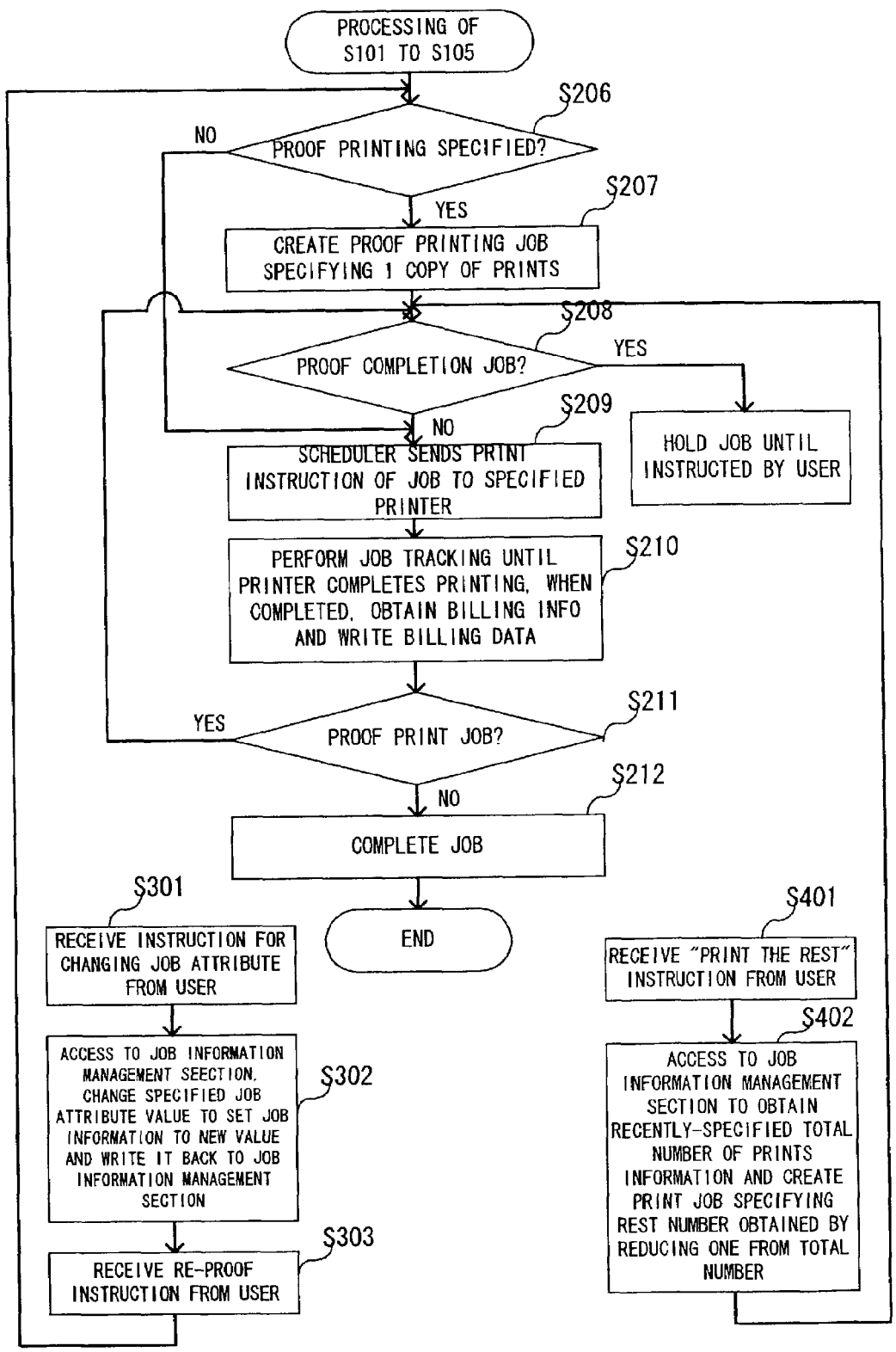
FIG. 8 is a flowchart illustrating a proof printing control procedure in the server.

Furthermore, as the proof printing, when a user specifies one hundred of sets of prints in the print driver, for example, it is possible to specify sample printing for a desired number of times of printing by a desired printer. In other words, in the case where there are multiple printers of a similar type, the user can select a printer which can provide the finest printing or the user can change a value of the print instruction. FIG. 8 shows the processing procedure in the server 3 for supporting the proof function.

FIG. 8 is a flowchart illustrating the proof printing control procedure in the server 3, in which S101 to S105 are the same as those shown in the flowchart of FIG. 7 as described above and thus the processing corresponding to those steps are omitted.

First of all, an explanation is made to an outline of the overall processing performed by the processing flow in the server 3 shown in FIG. 8.

As shown in FIG. 8, when a user specifies a proof printing (e.g., step S206), the server 3 sets the number of prints (the total number of prints desired to print finally) specified by a printer driver into job attributes by using the processing function in FIG. 7 (e.g., steps S101-S105).

Because the proof printing is specified, a printer prints only one set of prints by the server system according to the proof printing job (e.g., processing from step S209) and, after the printing is finished and billing information is obtained (e.g., step S210), the print job instructing the proof printing from the client terminal is not completed (without shifting to step S211 NO->S212) but is maintained in the job information management section 34 as a proof printing completion state (step S211 YES->S208 YES).

Thereafter, when the user selects this proof printing completion job by the exclusive UI of the system, for example, to change the stapling position that was set in the driver to be an upper-left position to two upper positions, if the user finds that the stapling position at the upper-left position is inconvenient, and performs the proof printing again, the server system performs the proof printing processing in the same manner as stated above under the conditions specified newly again by the user (the specified conditions obtained by the processing of S301-S303). Also, in this case, after the proof printing is completed and the billing information is obtained, the job is not completed but is maintained in the job information management section 34 as a proof printing completion state.

When the user selects this proof printing completion job by the exclusive UI of the system to request (e.g., when the server receives the instruction in step 401) that the rest of the number of prints should be printed, the print job is transmitted (e.g., step S209) to a printer as a print instruction for printing the number of prints which is obtained by deducting one set of print from the total number of prints which information was previously stored. When the printer finishes the printing, the billing information is obtained and the process is completed (e.g., steps S201->S211->S212->END).

An explanation is made to the processing procedures performed in the server 3 according to the flowchart shown in FIG. 8.

In FIG. 8, after the step S105, when the proof printing is specified by the user (step 206 YES), the server 3 sets the number of prints (the total number of prints desired to print finally) specified by the printer driver into job attributes by using the processing function in FIG. 7 (e.g., steps S101-S105).

Then, because the proof printing is specified, the server creates a proof printing job specifying the number of prints to be one set of prints (step S207).

Then, the scheduler sends the print instruction of the job to a printer that is specified by the scheduler (step S209), whereby the proof printing of only one set of prints is performed by the printer according to the proof printing job.

The server performs tracking until the printing by the printer is completed, and when the printing is completed, obtains billing information and writes billing data (step S210). Thereafter, because it is the proof printing job (step S211 YES), without shifting to the steps S211 NO->S212, namely, without completing the print job instructing the proof printing from the client terminal, the process goes back to the step S208 and the job is maintained in the job information management section 34 as a proof printing completion state (step S208 YES).

Further, as described above, when the user wishes to perform the proof printing again, the server 3 receives an instruction for changing job attributes from the user (step S301), accesses to the job information management section, changes the value of the specified job attribute to set the job information to a new value and write it back to the job information management section 34 (step S302), and receives an instruction for re-proof printing from the user (step S304).

Thereafter, in the server 3, the processing goes back to the step S206 and the server performs the proof printing processing in the same manner as stated above, whereby the re-proof printing is performed under the conditions newly specified by the user.

In this case also, after the proof printing is completed and the billing information is obtained, the job is not completed but is maintained in the job information management section 34 as a proof printing completion state (step S208 YES).

Further, in a case where the user wishes to perform the printing of the rest of the number of prints, the server 3 receives the instruction to print the rest number of prints from the user (step 401), accesses to the job information management section 34, obtains the specified total-number-of-prints information, and creates the printing job specifying the rest number of prints which is obtained by deducting one set of print from the total number of prints (step S402).

Thereafter, the process goes back to the step S208 and the process following the step S209 are performed. Namely, in this case, in the step S209, the printing job created in the step S402 is sent to the printer, whereby the rest of the number of prints are printed by the specific printer. As stated above, in the step S210, the tracking processing, billing information obtaining processing and writing processing of the billing data are performed. Thereafter, in the step S211, since this case it is not the proof printing job (step S211 NO), the printing job is completed (step S212) and the processing completes.

According to the above-mentioned configuration, it is possible to cope with the proof printing function.

Also, according to the above-mentioned configuration of the present invention, when information other than the information of the number of prints, such as "Collate/Uncollate, specified paper size, specified tray; both-side printing/single-side printing, or specified finishing, etc. are buried and specified in PDL data, it is possible to transmit data to a more suitable printer when using a best fit function, that is, a function for outputting to a most suitable printer from among multiple printers, by obtaining the print instruction information from the PDL.

What is claimed is:

1. A printing system having a print control server that corresponds a logical printer to multiple physical printers and supports a distributed printing manner over the physical printers, and a client terminal that specifies one or more of the physical printers associated with the server to make a print request, wherein the print control server comprises:

a receiving section that receives the print request from the client terminal;

a determining section that determines whether or not print data of the print request contains a print instruction;

a print instruction information obtaining section that, if the determining section determines that the print request contains the print instruction, obtains print instruction information from the print data; and a print control section that, if the print instruction information contains a print number specification and the distributed printing manner is specified as a divided output of printing, generates multiple print jobs that correspond to the number of prints specified by the print number specification, divides the generated multiple print jobs and allocates the divided jobs to the physical printers, and instructs each of the physical printers to perform respective one or more of the divided jobs, wherein each of the print jobs includes corresponding contents of the print instruction, wherein the determining section determines whether or not the print data contains print instruction described in Page Description Language (PDL); and the print instruction information obtaining section obtains the print instruction information from the print instruction described in PDL by pre-scanning the print data.

2. The printing system according to claim 1, wherein:

if the print instruction information contains the print number specification and the distributed printing manner is specified as a simultaneous-multi-output of printing, the print control section generates multiple print jobs that correspond to the number of prints specified by the print number specification, allocates the generated multiple print jobs to the physical printers, and instructs each of the physical printers to perform respective one or more of the allocated jobs, wherein each of the print jobs includes corresponding contents of the print instruction and the number of the generated jobs corresponds to a number of the physical printers.

3. The printing system according to claim 1, wherein:

if the divided output of printing is specified as the distributed printing manner, the print control section divides the generated multiple print jobs and allocates the divided jobs to one or more suitable physical printers selected from the physical printers that correspond to the logical printer, and instructs each of the suitable physical printers to perform respective one or more of the divided jobs, wherein the suitable physical printers satisfy the contents of the print instruction and are able to print.

4. The printing system according to claim 1, wherein:

the print instruction information includes at least one of print number specification information, output paper size information, both-side printing information, paper tray selection information, delivery destination information, stapling information, punching information, and sorting information.

5. A printing system having a print control server that corresponds a logical printer to multiple physical printers and supports a distributed printing manner over the physical printers, and a client terminal that specifies one or more of the physical printers associated with the server to make a print request, wherein the print control server comprises:

a receiving section that receives the print request from the client terminal;

a determining section that determines whether or not print data of the print request contains a print instruction;

a print instruction information obtaining section that, if the determining section determines that the print request contains the print instruction, obtains print instruction information from the print data; and a print control section that, if the print instruction information contains a print number specification and the distributed printing manner is specified as a divided output of printing, generates multiple print jobs that correspond to the number of prints specified by the print number specification, divides the generated multiple print jobs and allocates the divided jobs to the physical printers, and instructs each of the physical printers to perform respective one or more of the divided jobs, wherein each of the print jobs includes corresponding contents of the print instruction, wherein if the print instruction information contains the print number specification and a proof printing is specified, the print control section generates one or more proof print jobs for the proof printing that each includes corresponding contents of the print instruction and instructs one or more of the physical printers to perform the proof print jobs; and when the proof print jobs are completed, the print control section generates one or more remaining print jobs that each includes the corresponding contents of the print instruction, allocates the generated remaining jobs to the physical printers, and instructs one or more of the physical printers to perform respective one or more of the allocated remaining jobs, wherein the number of the generated remaining jobs corresponds to a number obtained by subtracting the number of prints of the proof print jobs from the number of prints specified by the specification of number of prints.

6. A print control server in which a logical printer that corresponds to multiple physical printers is set and supports a distributed printing manner over the physical printers, comprising:

a receiving section that receives a print request from a client terminal;

a determining section that determines whether or not print data of the print request contains print instruction;

a print instruction information obtaining section that, if the determining section determines that the print request contains the print instruction, obtains print instruction information from the print data; and a print control section that, if the print instruction information contains a print number specification and the distributed printing manner is specified as a divided output of printing, generates multiple Print jobs that correspond to the number of prints specified by the print number specification, divides the generated multiple print jobs and allocates the divided jobs to the physical printers, and instructs each of the physical printers to perform respective one or more of the divided jobs, wherein each of the print jobs includes corresponding contents of the print instruction, wherein if the print instruction information contains the print number specification and a proof printing is specified, the print control section generates one or more proof print jobs for the proof printing that each includes corresponding contents of the print instruction and instructs one or more of the physical printers to perform the proof print jobs; and when the proof print jobs are completed, the print control section generates one or more remaining print jobs that each includes the corresponding contents of the print instruction, allocates the generated remaining jobs to the physical printers, and instructs one or more of the physical printers to perform respective one or more of the allocated remaining jobs, wherein the number of the generated remaining jobs corresponds to a number obtained by subtracting the number of prints of the proof print jobs from the number of prints specified by the specification of number of prints.

7. A print control server in which a logical printer that corresponds to multiple physical printers is set and supports a distributed printing manner over the physical printers, comprising:

a receiving section that receives a print request from a client terminal;

a determining section that determines whether or not print data of the print request contains print instruction;

a print instruction information obtaining section that, if the determining section determines that the print request contains the print instruction, obtains print instruction information from the print data; and a print control section that, if the print instruction information contains a print number specification and the distributed printing manner is specified as a divided output of printing, generates multiple print jobs that correspond to the number of prints specified by the print number specification, divides the generated multiple print jobs and allocates the divided jobs to the physical printers, and instructs each of the physical printers to perform respective one or more of the divided jobs, wherein each of the print jobs includes corresponding contents of the print instruction, wherein the determining section determines whether or not the print data contains print instruction from the print instruction described in PDL by pre-scanning the print data.

8. The print control server according to claim 7, wherein:

if the print instruction information contains the print number specification and the distributed printing maimer is specified as a simultaneous-multi-output of printing, the print control section generates multiple print jobs that correspond to the number of prints specified by the print number specification, allocates the generated multiple print jobs to the physical printers, and instructs each of the physical printers to perform respective one or more of the allocated jobs, wherein each of the print jobs includes corresponding contents of the print instruction and the number of the generated jobs corresponds to a number of the physical printers.

9. The print control server according to claim 7, wherein:

if the divided output of printing is specified as the distributed printing manner, the print control section divides the generated multiple print jobs and allocates the divided jobs to one or more suitable physical printers selected from the physical printers that correspond to the logical printer, and instructs each of the suitable physical printers to perform respective one or more of the divided jobs, wherein the suitable physical printers satisfy the contents of the print instruction and are able to print.

10. The print control server according to claim 7, wherein:

the print instruction information includes at least one of print number specification information, output paper size information, both-side printing information, paper tray selection information, delivery destination information, stapling information, punching information, and sorting information.

11. A print control method of a print control server that corresponds a logical printer to multiple physical printers and supports a distributed printing manner over the physical printers, comprising:

receiving, by a receiving section, a print request from a client terminal;

determining, by a determining section, whether or not print data of the print request contains a print instruction;

obtaining, by a print instruction information obtaining section, print instruction information from the print data if the determining section determines that the print request contains the print instruction, wherein if the print instruction information contains a print number specification and the distributed printing manner is specified as a divided output of printing. the method further includes:

generating multiple print jobs that correspond to the number of prints specified by the print number specification;

dividing the generated multiple print jobs and allocating the divided jobs to the physical printers; and instructing each of the physical printers to perform respective one or more of the divided jobs, wherein each of the print jobs includes corresponding contents of the print instruction, wherein if the print instruction information contains the print number specification and a proof printing is specified, the method further comprises:

generating one or more proof print jobs for the proof printing that each includes corresponding contents of the print instruction and instructs one or more of the physical printers to perform the proof print jobs; and when the proof print jobs are completed, generating one or more remaining print jobs that each includes the corresponding contents of the print instruction, allocating the generated remaining jobs to the physical printers, and instructing one or more of the physical printers to perform respective one or more of the allocated remaining jobs, wherein the number of the generated remaining jobs corresponds to a number obtained by subtracting the number of prints of the proof print jobs from the number of prints specified by the specification of number of prints.

12. A print control method of a print control server that corresponds a logical printer to multiple physical printers and supports a distributed printing manner over the physical printers, comprising:

receiving, by a receiving section, a print request from a client terminal;

determining, by a determining section, whether or not print data of the print request contains a print instruction;

obtaining, by a print instruction information obtaining section, print instruction information from the print data if the determining section determines that the print request contains the print instruction, wherein if the print instruction information contains a print number specification and the distributed printing manner is specified as a divided output of printing. the method further includes:
- generating multiple print jobs that correspond to the number of prints specified by the print number specification;
- dividing the generated multiple print jobs and allocating the divided jobs to the physical printers; and
- instructing each of the physical printers to perform respective one or more of the divided lobs, wherein each of the print jobs includes corresponding contents of the print instruction;
- determining if the print data contains print instruction described in Page Description Language (PDL); and
- obtaining, if the print data contains print instruction described in PDL, the print instruction information from the print instruction described in PDL by pre-scanning the print data.

13. The print control method according to claim 12, wherein if the print instruction information contains the print number specification and the distributed printing manner is specified as a simultaneous-multi-output of printing, the method further comprises:
- generating multiple print jobs that correspond to the number of prints specified by the print number specification;
- allocating the generated multiple print jobs to the physical printers; and
- instructing each of the physical printers to perform respective one or more of the allocated jobs, wherein each of the print jobs includes corresponding contents of the print instruction and the number of the generated jobs corresponds to a number of the physical printers.

14. The print control method according to claim 12, wherein if the divided output of printing is specified as the distributed printing manner, the method further comprises:
- dividing the generated multiple print jobs and allocating the divided jobs to one or more suitable physical printers selected from the physical printers that correspond to the logical printer; and
- instructing each of the suitable physical printers to perform respective one or more of the divided jobs, wherein the suitable physical printers satisfy the contents of the print instruction and are able to print.

15. The print control method according to claim 12, wherein the print instruction information includes at least one of print number specification information, output paper size information, both-side printing information, paper tray selection information, delivery destination information, stapling information, punching information, and sorting information.

* * * * *